Figure 1:
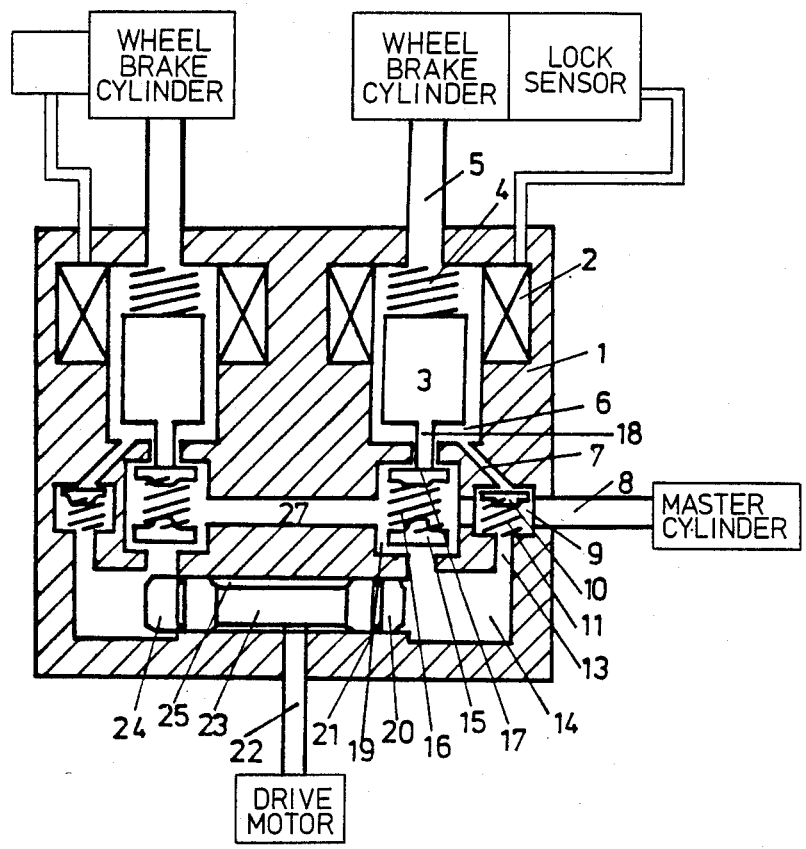

United States Patent [19]

Widmer

[11] Patent Number: 4,580,848
[45] Date of Patent: Apr. 8, 1986

[54] ANTILOCKING MECHANISM FOR VEHICLE BRAKE SYSTEM

[75] Inventor: Max Widmer, Beringen, Switzerland

[73] Assignee: ITT Industries, Inc., New York, N.Y.

[21] Appl. No.: 744,283

[22] Filed: Jun. 12, 1985

Related U.S. Application Data

[63] Continuation of Ser. No. 616,790, Jun. 1, 1984, abandoned, which is a continuation of Ser. No. 320,138, Nov. 10, 1981, abandoned.

[30] Foreign Application Priority Data

Nov. 11, 1980 [CH] Switzerland .................. 8349/80

[51] Int. Cl.$^4$ .......................... B60T 8/02; B60T 8/04
[52] U.S. Cl. ..................................... 303/116; 303/119
[58] Field of Search ............ 303/116, 111, 119, 10–12, 303/115, 113, 117, 61–63, 68–69, 100, 6 R; 417/273; 188/345, 181 A, 181 R, 181 C

[56] References Cited

U.S. PATENT DOCUMENTS

| 3,574,416 | 4/1971 | Skoyles ............................. 303/116 |
| 3,645,584 | 2/1972 | Leiber et al. .................... 303/61 X |
| 3,744,380 | 7/1973 | Steiger ............................ 417/273 X |
| 3,756,666 | 9/1973 | Leiber ............................. 303/116 X |
| 3,801,161 | 4/1974 | Sharp .............................. 303/116 X |
| 3,847,449 | 11/1974 | Adahan .............................. 303/116 |
| 3,881,782 | 5/1975 | Skoyles ............................. 303/116 |
| 3,948,568 | 4/1976 | Leiber ............................. 303/119 X |
| 4,310,290 | 1/1982 | Dantlgraber et al. ............. 417/273 |
| 4,354,715 | 10/1982 | Farr et al. ........................... 303/116 |

FOREIGN PATENT DOCUMENTS

| 0051800 | 5/1982 | European Pat. Off. ............ 303/116 |
| 2825480 | 1/1979 | Fed. Rep. of Germany . |
| 2189238 | 1/1974 | France . |
| 2036222 | 6/1980 | United Kingdom ................ 303/119 |

Primary Examiner—Douglas C. Butler
Attorney, Agent, or Firm—James B. Raden; William J. Michals

[57] ABSTRACT

An antilocking arrangement with piston pumps for pumping the braking agent back from the wheel cylinders to the master cylinder, all modulators are combined in one housing in such a way that the pump piston can be driven by a single eccentric. For this purpose, all pistons as well as all paths of movement of the pistons are disposed in the plane of rotation of the eccentric.

1 Claim, 3 Drawing Figures

ANTILOCKING MECHANISM FOR VEHICLE BRAKE SYSTEM

This application is a continuation of my copending application is a continuation of my copending application Ser. No. 06/616,790, filed June 1, 1984, which is a continuation of Ser. No. 06/320,138, filed Nov. 10, 1981, both of which are now abandoned.

This invention relates to an antilocking mechanism for use in the braking system of vehicle of a type wherein the brake-actuating fluid pressure medium is returned to the master or main cylinder in the event of a tendency of the wheels to lock.

BACKGROUND OF THE INVENTION

Antilocking mechanisms are known in which a control valve is disposed in a main braking fluid line leading from the main or master cylinder to the wheel brake cylinder, which valve has two positions. In one of those positions there is free passage of the braking medium in both directions, and in the second position only the return flow from the wheel to the master brake cylinder is possible. In the event of locking, the brake medium is pumped by means of a pump in the direction toward the master brake cylinder for the purpose of decreasing pressure in the wheel cylinder. The path followed by the brake medium in that event is different depending on the type of construction. In some constructions, the same path that has been taken by the brake medium from the master cylinder to the wheel cylinder is followed, and in others it can be a by-pass line of the control valve which has two check valves opening in the direction toward the master cylinder with the pump between them, wherein this path, in addition, may have a blow-off or surge tank in front of the first check valve and therefore must be closed by still another valve with respect to the main brake line, etc.

All such systems have the one disadvantage in common that for every regulation of a wheel a separate pump with a corresponding drive must be available.

BRIEF DESCRIPTION OF THE INVENTION

An object of the present invention is to eliminate this disadvantage and to provide an antilocking arrangement which operates so that, insofar as this is logically possible, all functional parts present in multiple need be constructed only once for each of the connections of the construction groups.

Briefly described, the invention includes, in an antilocking mechanism for use with the brake system of a motor vehicle of the type wherein brake fluid is returned from the wheel to the master cylinder of the brake system by pump pistons in the event of locking, the improvement comprising a single eccentric drive element for jointly driving all of the pump pistons associated with the wheels.

Figure 2:
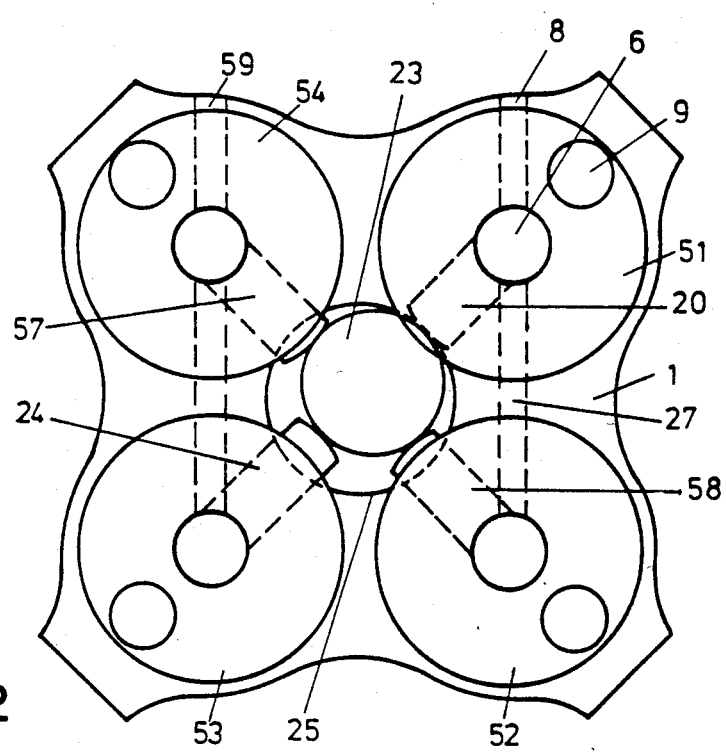
Figure 3:
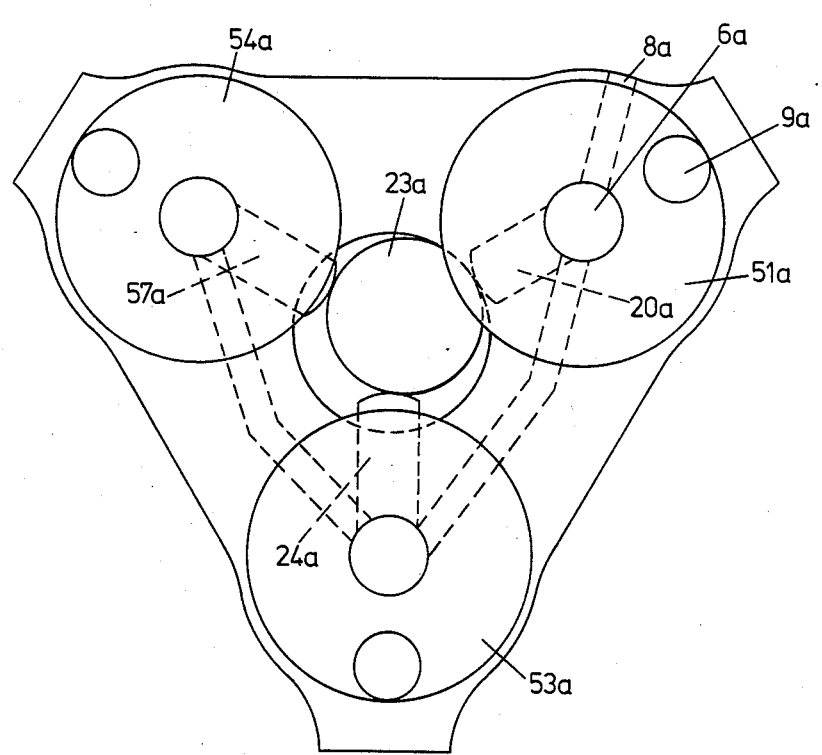

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a side elevation in section through a mechanism in accordance with the invention including two diametrically disposed modulators for the control of the braking agent pressure in a wheel brake cylinder; and schematically illustrating the fluid connections of this mechanism to a master brake cylinder and individual wheel cylinders, the electrical connections of this mechanism to individual wheel lock sensors, and the mechanical connection of this mechanism to a pump drive motor;

FIG. 2 is a top plan view of the apparatus of FIG. 1 showing the interconnection of four modulators with a single drive including a central eccentric; and FIG. 3 is a view similar to FIG. 2 except that it shows the interconnection of three modulators with such a drive.

FIG. 1 shows a vertical section through an antilocking arrangement in accordance with the invention, the section being taken so that it passes axially through two diametrically opposed modulators of the four modulators which are symmetrically disposed in a cylindrically symmetrical housing 1. All four of the modulators are identical, except for their positions in the housing, and it will therefore be necessary to describe only one of these modulators in detail.

In a bore 6 of the housing 1 there is an armature 3 of an electromagnet 2, the electromagnet being arranged so that the armature is urged downwardly by means of a spring 4, while energization of the winding of electromagnet 2 urges the armature upwardly with a force exceeding the force of the spring.

Armature 3 is provided with an axial extension 18 which, when the armature is urged downwardly by spring 4, maintains a check valve 17 in an open condition, valve 17 being disposed in a bore 19, the valve being arranged so that it opens a path surrounding extension 18 of the armature. Directly opposite check valve 17 is an oppositely directed second check valve 15, the two valves 15 and 17 being urged away from each other by a single spring 16 extending between the two valve members. A line 7 leaves from bore 6 to an additional check valve 10 which is housed in a bore 9 and is urged toward its closed position by a spring 11, the valve being arranged so that fluid passage from bore 6 to bore 9 is possible at all times.

Bores 9 and 19 are in fluid communication with a chamber 14, the volume of which can be enlarged periodically by means of a pump piston 20 and, in between volume enlargements, is returned to its original size.

Between check valves 15 and 17, bore 19 is interconnected with a connecting line 27 which is, in turn, connected with the brake line 8 leading to the main or master brake cylinder. Line 5, at the other side of this portion of the fluid circuit, interconnects bore 6 with the wheel brake cylinder.

The second modulator disposed in the same housing symmetrically with the one described, has a pump piston 24, and both of pistons 20 and 24 are driven by a cam 23 which is connected to a rotary shaft 22 so that they are simultaneously driven in opposite directions to the left and right. In the embodiment shown, they move in a single bore 25, which forms a central cavity within the chamber 14, against which they are sealed by O-rings 21. The shaft 22 is co-linear with the axis of cylindrical symmetry of the housing 1.

The function of the modulator described is as follows. In such brake systems, each wheel is provided with a sensor capable of detecting the occurrence of locking. In the usual case, when no locking signal comes from the wheel sensors, the electromagnetic 2 is de-energized and armature 3 is forced into its lower position by spring 4. As a result of that, the check valve 17 is open and brake fluid can flow throough lines 8 and 27 through open valve 17 into bore 6 and, further, through line 5 to the wheel brake cylinder and also back. Thus, the elements 8, 27, 19, 17, 18, 6 and 5 form a bidirectional fluid flow path between the master cylinder and each wheel cylinder, so that conventional braking and release of tension is made possible.

Upon the occurrence of locking of a wheel, its sensor will respond and cause energization of electromagnet 2 by way of conventional electric control arrangements and, simultaneously, eccentric 23 is caused to rotate by driven shaft 22 so that the two pistons 20 and 24 will start to pump. As a result of the energization of electromagnet 2, armature 3 is pulled up and valve 17 engages its seat under the pressure of spring 16 so that passage of the braking fluid from the master cylinder to the wheel cylinder is interrupted. Then, when piston 20 is forced to the left, brake fluid will continue to flow from the wheel cylinder through bore 6 into the enlarged chamber 14 by way of the open check valve 10 since check valve 15 is closed by spring 16 and the reduced pressure (relative to bore 6) developed in chamber 14. When piston 20 goes through its reverse movement, valve 10 is closed and, instead, valve 15 opens, so that brake fluid, with valve 17 closed, is forced into line 27 and 8 leading to the master cylinder. In effect, elements 5, 6, 7, 9, 10, 13 and 14 (during a first phase of piston travel) and 14, 15, 27 and 8 (during the opposite phase of piston travel) form a unidirectional fluid flow path (in parallel with the bidirectional path described above) leading from the wheel cylinder to the master cylinder. In this manner, the pressure in the wheel cylinder is decreased and the wheel again is allowed to obtain better contact with the road.

FIG. 2 shows the cylindrical symmetry of the housing 1, and manner in which in a joint brake housing for the four modulators 51, 52, 53 and 54 are disposed therein, each modulator being assigned to one wheel of a four-wheel vehicle, in order to drive the pistons 20, 24, 57 and 58 by means of a single eccentric 23 and, as a consequence of that, by means of a single drive motor. For this purpose, the four modulators 51–54 are disposed symmetrically immediately around eccentric 23, which is housed in bore 25, in such a way that the pistons of all modulators are directed in the direction of the eccentric. As a result of the rotation of the eccentric, the pistons are forced one after the other in the direction toward it associated bore 6, whereupon they are urged under the pressure of the braking agent against the eccentric and are moved again in the direction of the common center.

Two modulators are thus connected by means of a connecting line 27 and from the modulators 51 and 54 two lines 8 or 59 lead out, which lines are connected with the master cylnder, not shown.

In a system of the type wherein antilocking regulation is provided with a holding phase in which the pressure of the brake medium is to be kept constant from time to time despite a locking signal, there are coupling arrangements which bring the pistons logically into contact only with the eccentric whenever the braking medium pressure is to be decreased.

In the case of a four-wheel vehicle with individually regulated front and jointly regulated rear wheels, the three modulators can be disposed around the eccentric at angles of separation of 120° as shown in FIG. 3, rather than the 90° separation shown in the embodiment of FIG. 2. The reference numerals of FIG. 3 are the same as those of FIG. 2, except for the subscript "a" appended to those of FIG. 3, so as to illustrate the correspondence between the elements of these two figures.

While certain advantageous embodiments have been chosen to illustrate the invention it wll be understood by those skilled in the art that various changes and modifications can be made therein without departing from the scope of the invention as defined in the appended claims.

What is claimed is:

1. In an antilocking mechanism for use with the brake system of a wheeled vehicle having a master cylinder and a plurality of wheels, wherein each wheel has a wheel cylinder for operating a brake, the mechanism being of the type wherein brake fluid is returned from said wheel cylinders to said master cylinder by pump pistons in the event of locking, and of the type wherein a plurality of said pump pistons are operated by a common motor-driven eccentric drive mechanism, the improvement comprising integrated fluid path and fluid pumping means including:

a common housing for said fluid path and fluid pumping means, said housing being cylindrically symmetrical and thereby defining an axis of cylindrical symmetry;

chamber means including a central cavity formed in the interior of said housing, said chamber means being located at one axial end of said housing and said cavity being located centrally within said chamber means and straddling said axis;

a plurality of pistons slidably mounted in the interior of said housing for reciprocating movement radially of said housing and extending outwardly from said central cavity and angularly separated by 360 degrees divided by the number of said pistons;

said pistons each having a portion extending into said cavity;

a common eccentric mounted in said cavity for rotation about said axis and engaging said piston portions for thereby sequentially operating each of said pistons;

the interior of said housing being formed with a plurality of bores forming first and second conduit means for each of said pistons, said conduit means defining a pair of parallel fluid paths between the master cylinder and at least one of said wheel cylinders, and said mechanism further including a solenoid-actuated valve enclosed within one of said bores and controlling fluid flow in one of said parallel paths of each said pair, and a unidirectional valve enclosed within another of said bores and controlling fluid flow in the other of said parallel paths of each said pair, said bores being axially displaced from said chamber means toward the other axial end of said housing but extending axially into fluid communication with said chamber means.

* * * * *